United States Patent
Yamano et al.

(10) Patent No.: US 10,622,647 B2
(45) Date of Patent: Apr. 14, 2020

(54) FUEL CELL (71) Applicant: HONDA MOTOR CO., LTD., Tokyo (JP)

(72) Inventors: Naoki Yamano, Wako (JP); Narutoshi Sugita, Wako (JP); Jun Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 404 days.

(21) Appl. No.: 15/293,286

(22) Filed: Oct. 14, 2016

(65) Prior Publication Data
US 2017/0110745 A1 Apr. 20, 2017

(30) Foreign Application Priority Data

Oct. 16, 2015 (JP) .................. 2015-204405

(51) Int. Cl.
*H01M 8/04082* (2016.01)
*H01M 8/0265* (2016.01)
*H01M 8/1004* (2016.01)
*H01M 8/0267* (2016.01)
*H01M 8/1018* (2016.01)

(52) U.S. Cl.
CPC ..... *H01M 8/04201* (2013.01); *H01M 8/0265* (2013.01); *H01M 8/0267* (2013.01); *H01M 8/1004* (2013.01); *H01M 2008/1095* (2013.01); *H01M 2250/20* (2013.01); *Y02E 60/521* (2013.01); *Y02T 90/32* (2013.01)

(58) Field of Classification Search
None
See application file for complete search history.

(56) References Cited

U.S. PATENT DOCUMENTS

| 7,736,785 | B2 | 6/2010 | Oda et al. | |
|---|---|---|---|---|
| 8,911,917 | B2 | 12/2014 | Sato et al. | |
| 2006/0093891 | A1* | 5/2006 | Issacci | H01M 8/0258 429/482 |
| 2010/0035122 | A1* | 2/2010 | Yamamoto | H01M 8/0254 429/406 |
| 2010/0129694 | A1* | 5/2010 | Sugiura | H01M 8/026 429/483 |
| 2012/0009502 | A1* | 1/2012 | Darling | H01M 8/0204 429/512 |

(Continued)

FOREIGN PATENT DOCUMENTS

JP 2012-164467 8/2012

*Primary Examiner* — Amanda J Barrow
(74) *Attorney, Agent, or Firm* — Mori & Ward, LLP (57) ABSTRACT

A fuel cell includes a first separator including a reactant gas buffer portion which includes a first buffer region and a second buffer region. The first buffer region has a first depth in the stacking direction. First embossed portions are formed in the first buffer region. Each of the first embossed portions has a first diameter and a first radius of a corner at a distal end of each of the first embossed portions. The second buffer region has a second depth in the stacking direction larger than the first depth. Second embossed portions are formed in the second buffer region. Each of the second embossed portions has a second diameter and a second radius of a corner at a distal end of each of the second embossed portions. The second diameter is smaller than the first diameter or the second radius is smaller than the second diameter.

12 Claims, 8 Drawing Sheets

(56) References Cited

U.S. PATENT DOCUMENTS

| | | | | |
|---|---|---|---|---|
| 2012/0129071 A1* | 5/2012 | Sato | ............ | H01M 8/0204 |
| | | | | 429/457 |
| 2012/0129073 A1* | 5/2012 | Spencer | ......... | H01M 8/0247 |
| | | | | 429/460 |
| 2012/0321987 A1* | 12/2012 | Goto | ............ | H01M 8/0258 |
| | | | | 429/480 |
| 2013/0337359 A1* | 12/2013 | Sugiura | ......... | H01M 4/242 |
| | | | | 429/457 |
| 2015/0104729 A1 | 4/2015 | Ishida et al. | | |

* cited by examiner

FUEL CELL

CROSS-REFERENCE TO RELATED APPLICATIONS

The present application claims priority under 35 U.S.C. § 119 to Japanese Patent Application No. 2015-204405, filed Oct. 16, 2015, entitled "Fuel Cell." The contents of this application are incorporated herein by reference in their entirety.

BACKGROUND

1. Field

The present disclosure relates to a fuel cell.

2. Description of the Related Art

In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates) that sandwich the membrane electrode assembly constitute a power generation cell (unit fuel cell). A predetermined number of power generation cells are stacked and used, for example, as a vehicle fuel cell stack.

Typically, a fuel cell is structured as a so-called "internal manifold fuel cell" so that a fuel gas and an oxidant gas, each of which is a reactant gas, can be respectively supplied to anode electrodes and cathode electrodes of power generation cells that are stacked.

The internal manifold fuel cell includes reactant gas inlet manifolds (a fuel gas inlet manifold and an oxidant gas inlet manifold) and reactant gas outlet manifolds (a fuel gas outlet manifold and an oxidant gas outlet manifold), each extending in a stacking direction of the power generation cells. The reactant gas inlet manifolds and the reactant gas outlet manifolds are connected to reactant gas channels (a fuel gas channel and an oxidant gas channel), which supply the reactant gases along electrode surfaces. The reactant gas inlet manifolds are connected to the inlets of the reactant gas channels, and the reactant gas outlet manifolds are connected to the outlets of the reactant gas channels.

In such a fuel cell, the opening areas of the reactant gas inlet manifolds and the reactant gas outlet manifolds are comparatively small. Accordingly, in order to make the reactant gases to flow smoothly over the entirety of electrode reaction surfaces, it is necessary to form buffer portions, which function to disperse the reactant gases, in the vicinities of the reactant gas inlet manifolds and the reactant gas outlet manifolds.

For example, Japanese Unexamined Patent Application Publication No. 2012-164467 describes a fuel cell that is capable of uniformly and reliably supplying reactant gases from the reactant gas inlet manifolds to the entirety of the reactant gas channels through the buffer portions. In the fuel cell, a first buffer portion, which connects a first reactant gas manifold and a first reactant gas channel to each other, is formed on one surface of a separator. A second buffer portion, which connects a second reactant gas manifold and a second reactant gas channel to each other, is formed on the other surface of the separator.

The first buffer portion includes a first dedicated buffer region that is adjacent to the first reactant gas manifold, through which one of the reactant gases flows, and that restricts flow of the other reactant gas on the second buffer portion side. The second buffer portion includes a second dedicated buffer region that is adjacent to the second reactant gas manifold, through which the other reactant gas flows, and that restricts flow of the one of the reactant gases on the first buffer portion side.

The first buffer portion and the second buffer portion respectively have common buffer regions through which the one of the reactant gases and the other reactant gas flow. The depth of each of the first dedicated buffer region and the second dedicated buffer region is larger than that of a corresponding one of the common buffer regions.

It is described that, with such a structure, the reactant gases can be uniformly and reliably supplied to the entirety of the first reactant gas channel and the entirety of the second reactant gas channel from the first reactant gas manifold and the second reactant gas manifold through the first buffer portion and the second buffer portion, respectively.

SUMMARY

According to one aspect of the present invention, a fuel cell includes a membrane electrode assembly in which electrodes are disposed on both sides of an electrolyte membrane; and separators stacked on the membrane electrode assembly. One of the separators facing one of the electrodes includes a reactant gas channel through which a reactant gas flows along an electrode surface. The one of the separators further includes a reactant gas manifold through which the reactant gas flows in a stacking direction in which the membrane electrode assembly and the separators are stacked, and a reactant gas buffer portion that connects the reactant gas channel and the reactant gas manifold to each other.

The reactant gas buffer portion includes a first buffer region, and a second buffer region having a depth in the stacking direction that is larger than that of the first buffer region. A plurality of first embossed portions are formed in the first buffer region. A plurality of second embossed portions are formed in the second buffer region. A diameter of each of the second embossed portions is smaller than that of each of the first embossed portions, or a radius of a corner at an end of each of the second embossed portions is smaller than that of each of the first embossed portions.

According to another aspect of the present invention, a fuel cell includes a membrane electrode assembly, first and second separators. The membrane electrode assembly includes an electrolyte membrane and first and second electrodes. The first and second electrodes sandwich the electrolyte membrane between the first and second electrodes in the stacking direction. The first and second separators are stacked on the first and second electrodes, respectively, in the stacking direction to form a reactant gas channel between the first electrode and the first separator. The first separator includes a reactant gas manifold and a reactant gas buffer portion. The reactant gas is to flow in the stacking direction through the reactant gas manifold. The reactant gas buffer portion connects the reactant gas channel and the reactant gas manifold. The reactant gas buffer portion includes a first buffer region and a second buffer region. The first buffer region has a first depth in the stacking direction. First embossed portions are formed in the first buffer region. Each of the first embossed portions has a first diameter and a first radius of a corner at a distal end of each of the first embossed portions. The second buffer region has a second depth in the stacking direction larger than the first depth. Second embossed portions are formed in the second buffer region. Each of the second embossed portions has a second diameter and a second radius of a corner at a distal end of each of the second embossed portions. The second diameter is smaller than the first diameter or the second radius is smaller than the second diameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
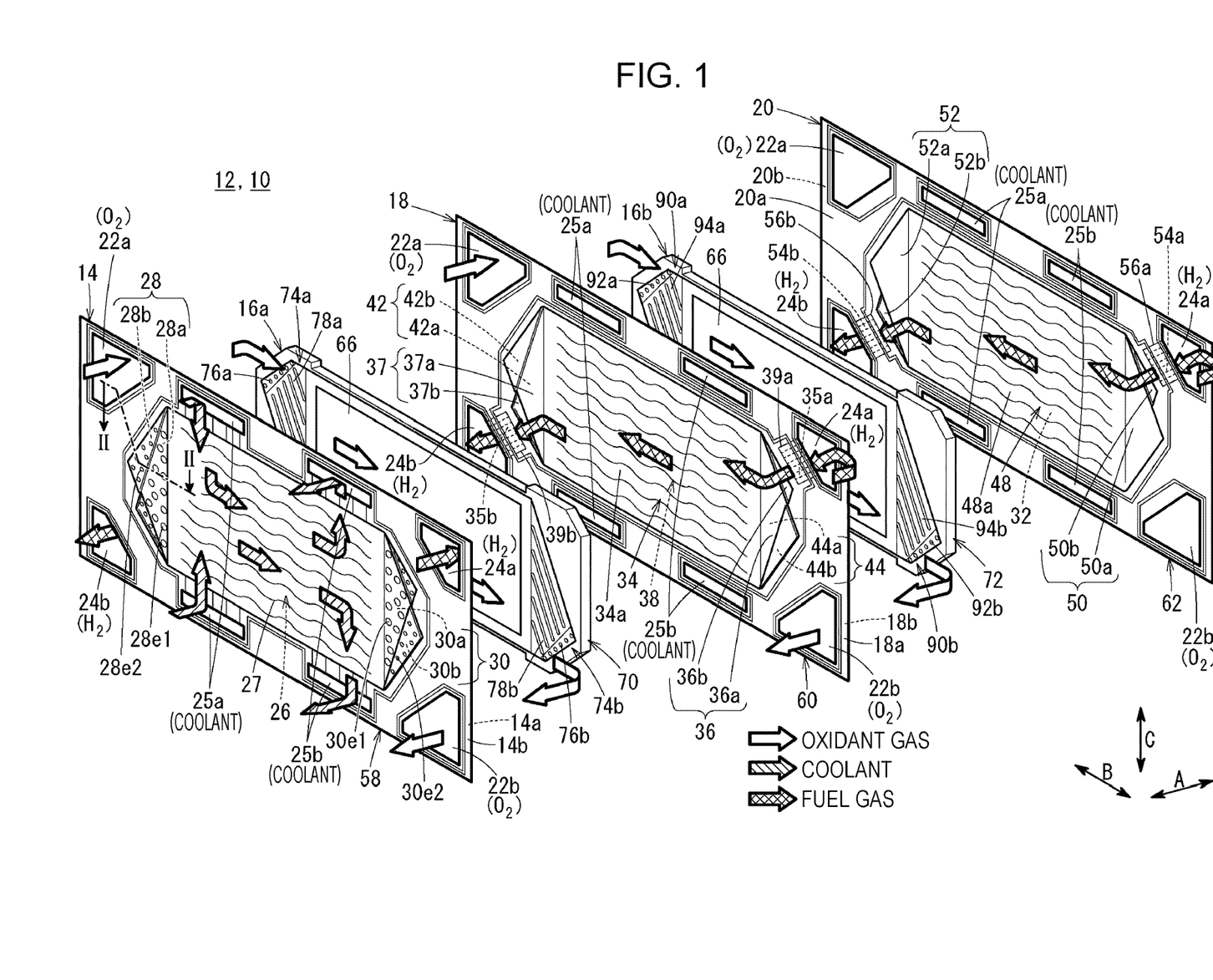
FIG. 1 is an exploded partial perspective view of a power generation cell included in a fuel cell according to a first embodiment of the present disclosure.
Figure 2:
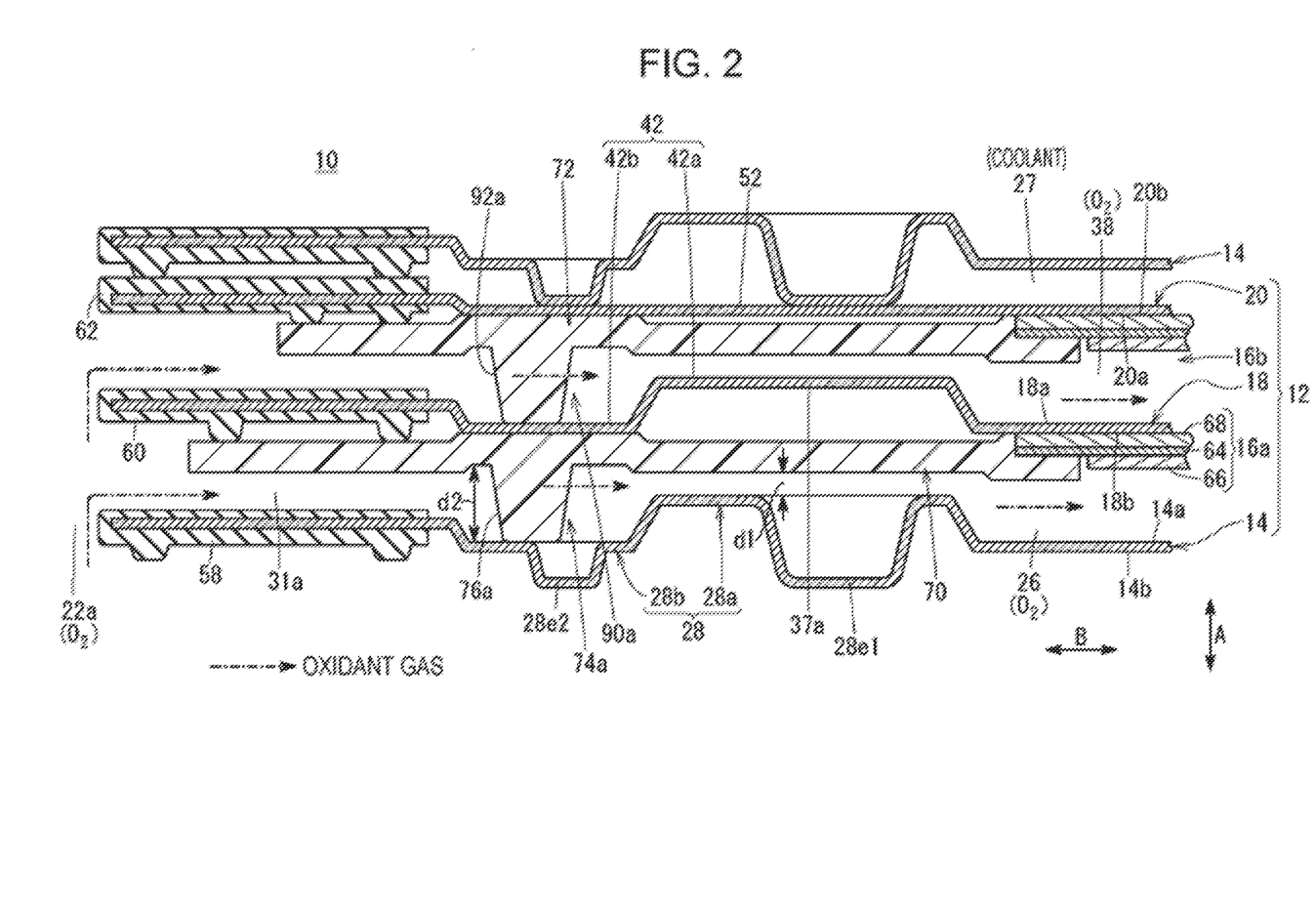
FIG. 2 is a sectional view of the power generation cell taken along line II-II in FIG. 1.

Referring to FIGS. 1 and 2, a fuel cell 10 according to a first embodiment of the present disclosure includes a plurality of power generation cells 12 that are stacked in a horizontal direction (direction of arrow A) or in a vertical direction (direction of arrow C). The fuel cell 10 is used, for example, as a vehicle fuel cell stack mounted in a fuel cell electric automobile (not shown).

Each of the power generation cells 12 includes a first metal separator 14, a first membrane electrode assembly 16a, a second metal separator 18, a second membrane electrode assembly 16b, and a third metal separator 20.

Each of the first metal separator 14, the second metal separator 18, and the third metal separator 20 is made from, for example, a steel plate, a stainless steel plate, an aluminum plate, a galvanized steel plate, or the like. Each of the first metal separator 14, the second metal separator 18, and the third metal separator 20, which has a rectangular shape in plan view, is made by press-forming a thin metal plate so as to have a wave-shaped cross section. Carbon separators may be used instead of the first metal separator 14, the second metal separator 18, and the third metal separator 20.

Referring to FIG. 1, an oxidant gas inlet manifold 22a (reactant gas manifold) and a fuel gas outlet manifold 24b (reactant gas manifold) are disposed in the power generation cell 12 so as to extend in the direction of arrow A through one end portion of the power generation cell 12 in the longitudinal direction (direction of arrow B). An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a (reactant gas manifold) and an oxidant gas outlet manifold 22b (reactant gas manifold) are disposed in the power generation cell 12 so as to extend in the direction of arrow A through the other end portion of the power generation cell 12 in the longitudinal direction. The fuel gas is supplied through the fuel gas inlet manifold 24a. The oxidant gas is discharged through the oxidant gas outlet manifold 22b.

A pair of coolant inlet manifolds 25a are disposed in the power generation cell 12 so as to extend in the direction arrow A through upper and lower end portions (that are near the oxidant gas inlet manifold 22a) of the power generation cell 12 in the transversal direction (direction of arrow C). A coolant is supplied through the coolant inlet manifolds 25a. A pair of coolant outlet manifolds 25b are disposed in upper and lower end portions (that are near the fuel gas inlet manifold 24a) of the power generation cell 12 in the transversal direction. The coolant is discharged through the coolant outlet manifolds 25b.

Figure 3:
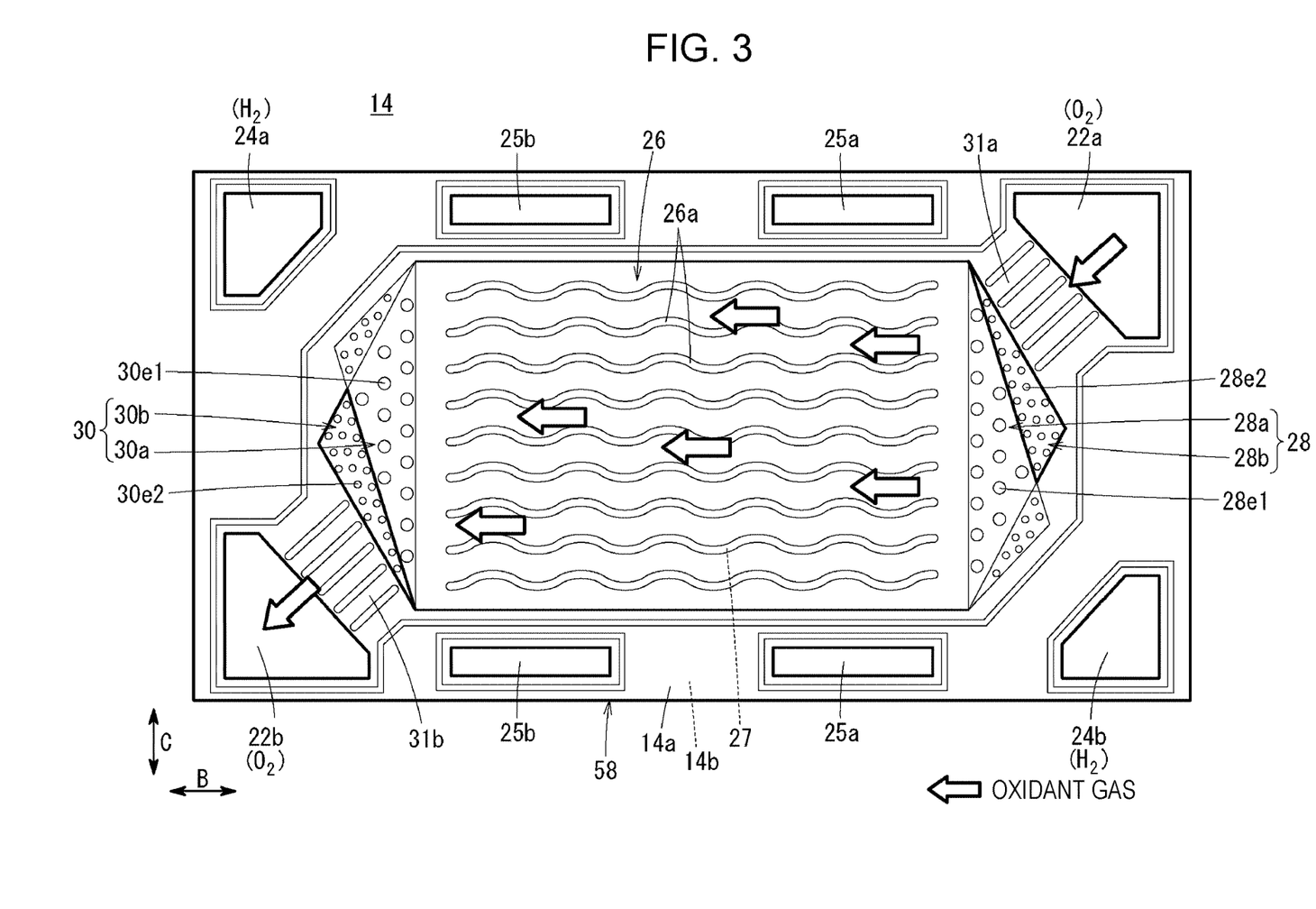
FIG. 3 is a plan view illustrating one surface of a first metal separator of the power generation cell.

Referring to FIG. 3, a first oxidant gas channel 26, which is connected to the oxidant gas inlet manifold 22a and the oxidant gas outlet manifold 22b, is formed on a surface 14a of the first metal separator 14 facing the first membrane electrode assembly 16a. The back side of the first oxidant gas channel 26 forms a part of a coolant channel 27.

The first oxidant gas channel 26 includes a plurality of wave-shaped channel grooves 26a (or linear channel grooves) extending in the direction of arrow B. A first oxidant gas inlet buffer portion 28 and a first oxidant gas outlet buffer portion 30 are respectively disposed in the vicinity of the inlet of the first oxidant gas channel 26 and in the vicinity of the outlet of the first oxidant gas channel 26.

The first oxidant gas inlet buffer portion 28 has a triangular shape. The first oxidant gas inlet buffer portion 28 includes a first oxidant gas inlet buffer region 28a (first buffer region) having a depth d1 between a first resin frame member 70 and the first metal separator 14, which is located close to the first oxidant gas channel 26. The first oxidant gas inlet buffer region 28a is located at a neutral position in the thickness direction of the first metal separator 14, that is, at a position that is not recessed nor protrudes from either the surface 14a and a surface 14b (see FIG. 2).

The first oxidant gas inlet buffer portion 28 includes a second oxidant gas inlet buffer region 28b (second buffer region) (see FIGS. 2 and 3), which is located closer to the oxidant gas inlet manifold 22a than the first buffer region and which has a depth d2 in the stacking direction that is larger than the depth d1 of the first oxidant gas inlet buffer region 28a between the first resin frame member 70 and the first metal separator 14. The second oxidant gas inlet buffer region 28b is formed on one side of a triangle.

A plurality of first embossed portions 28e1 are formed in the first oxidant gas inlet buffer region 28a. The plurality of first embossed portions 28e1 protrude from the depth d1 in the stacking direction away from the first resin frame member 70 as shown in FIG. 2. A plurality of second embossed portions 28e2 are formed in the second oxidant gas inlet buffer region 28b. The plurality of second embossed portions 28e2 protrude from the depth d2 in the stacking direction away from the first resin frame member 70 as shown in FIG. 2. Each of the first embossed portions 28e1 and the second embossed portions 28e2 has a cylindrical shape having a bottom and protruding from the surface 14b (toward the coolant channel 27). Each of the first embossed portions 28e1 and the second embossed portions 28e2 may have an elliptical or a quadrangular shape. If the embossed portion has a noncircular shape, the diameter of a circle having the same area as the noncircular shape is regarded as the diameter of the embossed portion.

Figure 4:
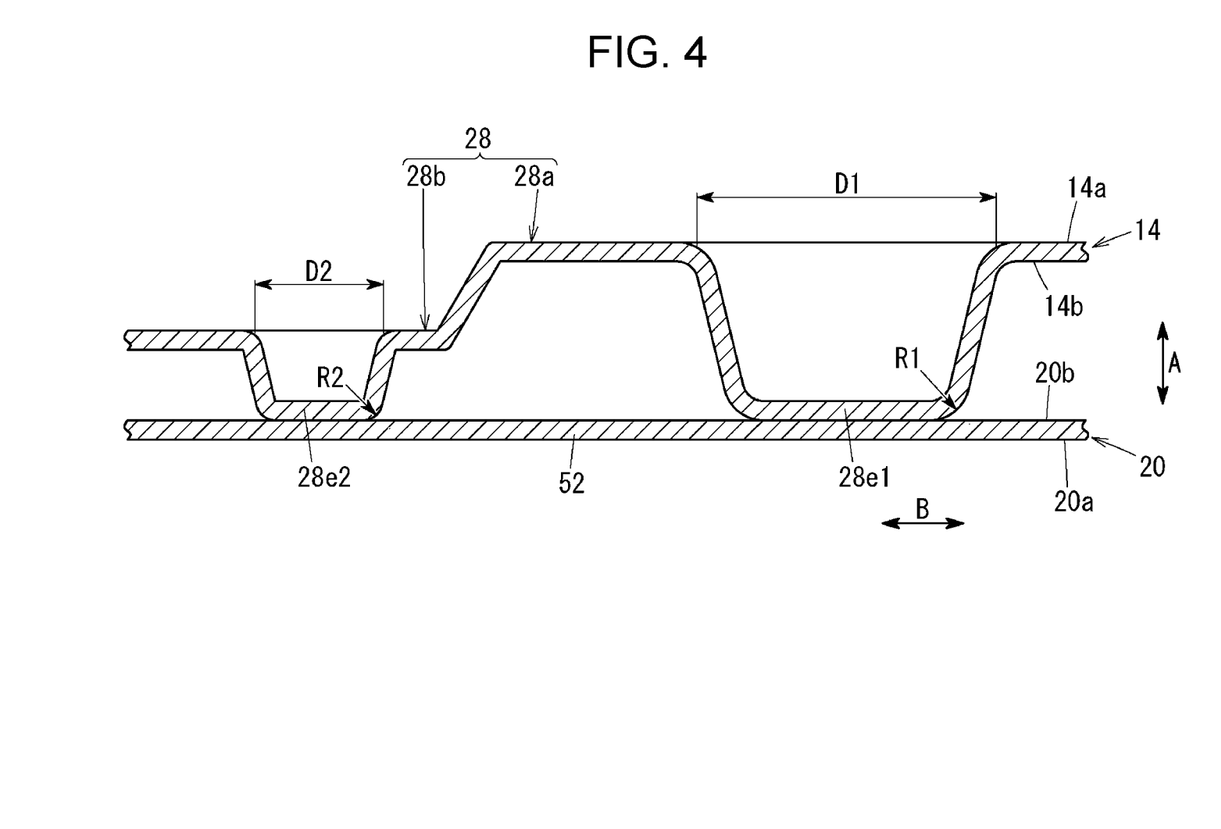
FIG. 4 is a partial sectional view of the power generation cell.

Referring to FIG. 4, each of the first embossed portions 28e1 has a diameter D1, and a rounded corner at an end of each of the first embossed portions 28e1 has a radius of curvature R1. Each of the second embossed portions 28e2 has a diameter D2, and a rounded corner at an end of each of the second embossed portions 28e2 has a radius of curvature R2. The diameter D2 of the second embossed portion 28e2 is smaller than the diameter D1 of the first embossed portion 28e1 (D2<D1). The radius of curvature R2 of the rounded corner at the end of the second embossed portion 28e2 is smaller than the radius of curvature R1 of the rounded corner at the end of the first embossed portion 28e1 (R2<R1). The first embossed portion 28e1 and the second embossed portion 28e2 may have at least one of the relationships D2<D1 and R2<R1.

Referring to FIGS. 1 and 3, the first oxidant gas outlet buffer portion 30 has a triangular shape. The first oxidant gas outlet buffer portion 30 includes a first oxidant gas outlet buffer region 30a (first buffer region), which is located close to the first oxidant gas channel 26. The first oxidant gas outlet buffer region 30a is located at a neutral position in the thickness direction of the first metal separator 14.

The first oxidant gas outlet buffer portion 30 includes a second oxidant gas outlet buffer region 30b (second buffer region), which is located close to the oxidant gas outlet manifold 22b and which has a depth in the stacking direction that is larger than that of the first oxidant gas outlet buffer region 30a. The second oxidant gas outlet buffer region 30b is formed on one side of a triangle.

A plurality of first embossed portions 30e1 are formed in the first oxidant gas outlet buffer region 30a. A plurality of second embossed portions 30e2 are formed in the second oxidant gas outlet buffer region 30b. Each of the first embossed portions 30e1 and the second embossed portions 30e2 has a cylindrical shape having a bottom and protruding from the surface 14b (toward the coolant channel 27). Each of the first embossed portions 30e1 and the second embossed portions 30e2 may have an elliptical or a quadrangular shape. If the embossed portion has a noncircular shape, the diameter of a circle having the same area as the noncircular shape is regarded as the diameter of the embossed portion.

As with the first embossed portions 28e1 and the second embossed portions 28e2 described above, the diameter each of the second embossed portions 30e2 is smaller than that of each of the first embossed portions 30e1, and/or the radius of the corner at the end of each of the second embossed portions 30e2 is smaller than that of each of the first embossed portions 30e1.

Referring to FIG. 3, a plurality of inlet connection grooves 31a are formed between the second oxidant gas inlet buffer region 28b and the oxidant gas inlet manifold 22a. A plurality of outlet connection grooves 31b are formed between the second oxidant gas outlet buffer region 30b and the oxidant gas outlet manifold 22b.

Referring to FIG. 1, a first fuel gas channel 34, which is connected to the fuel gas inlet manifold 24a and the fuel gas outlet manifold 24b, is formed on a surface 18a of the second metal separator 18 facing the first membrane electrode assembly 16a. The first fuel gas channel 34 includes a plurality of wave-shaped channel grooves 34a (or linear channel grooves) extending in the direction of arrow B.

A first fuel gas inlet buffer portion 36 and a first fuel gas outlet buffer portion 37 are respectively disposed in the vicinity of the inlet of the first fuel gas channel 34 and in the vicinity of the outlet of the first fuel gas channel 34. The first fuel gas inlet buffer portion 36 has a triangular shape. The first fuel gas inlet buffer portion 36 includes a first fuel gas inlet buffer region 36a, which is located close to the first fuel gas channel 34. The first fuel gas inlet buffer region 36a is located at a neutral position in the thickness direction of the second metal separator 18, that is, at a position that is not recessed nor protrudes from either of the surface 18a and a surface 18b.

The first fuel gas inlet buffer portion 36 includes a second fuel gas inlet buffer region 36b, which is located close to the fuel gas inlet manifold 24a and which has a depth in the stacking direction that is larger than that of the first fuel gas inlet buffer region 36a. The second fuel gas inlet buffer region 36b is formed on one side of a triangle.

The first fuel gas outlet buffer portion 37 has a triangular shape. The first fuel gas outlet buffer portion 37 includes a first fuel gas outlet buffer region 37a, which is located close to the first fuel gas channel 34. The first fuel gas outlet buffer region 37a is located at a neutral position in the thickness direction of the second metal separator 18.

The first fuel gas outlet buffer portion 37 includes a second fuel gas outlet buffer region 37b, which is located close to the fuel gas outlet manifold 24b and which has a depth in the stacking direction that is larger than that of the first fuel gas outlet buffer region 37a. The second fuel gas outlet buffer region 37b is formed on one side of a triangle.

A plurality of inlet connection grooves 35a are formed between the second fuel gas inlet buffer region 36b and the fuel gas inlet manifold 24a. The inlet connection grooves 35a are covered by a cover member 39a. A plurality of outlet connection grooves 35b are formed between the second fuel gas outlet buffer region 37b and the fuel gas outlet manifold 24b. The outlet connection grooves 35b are covered by a cover member 39b.

Figure 5:
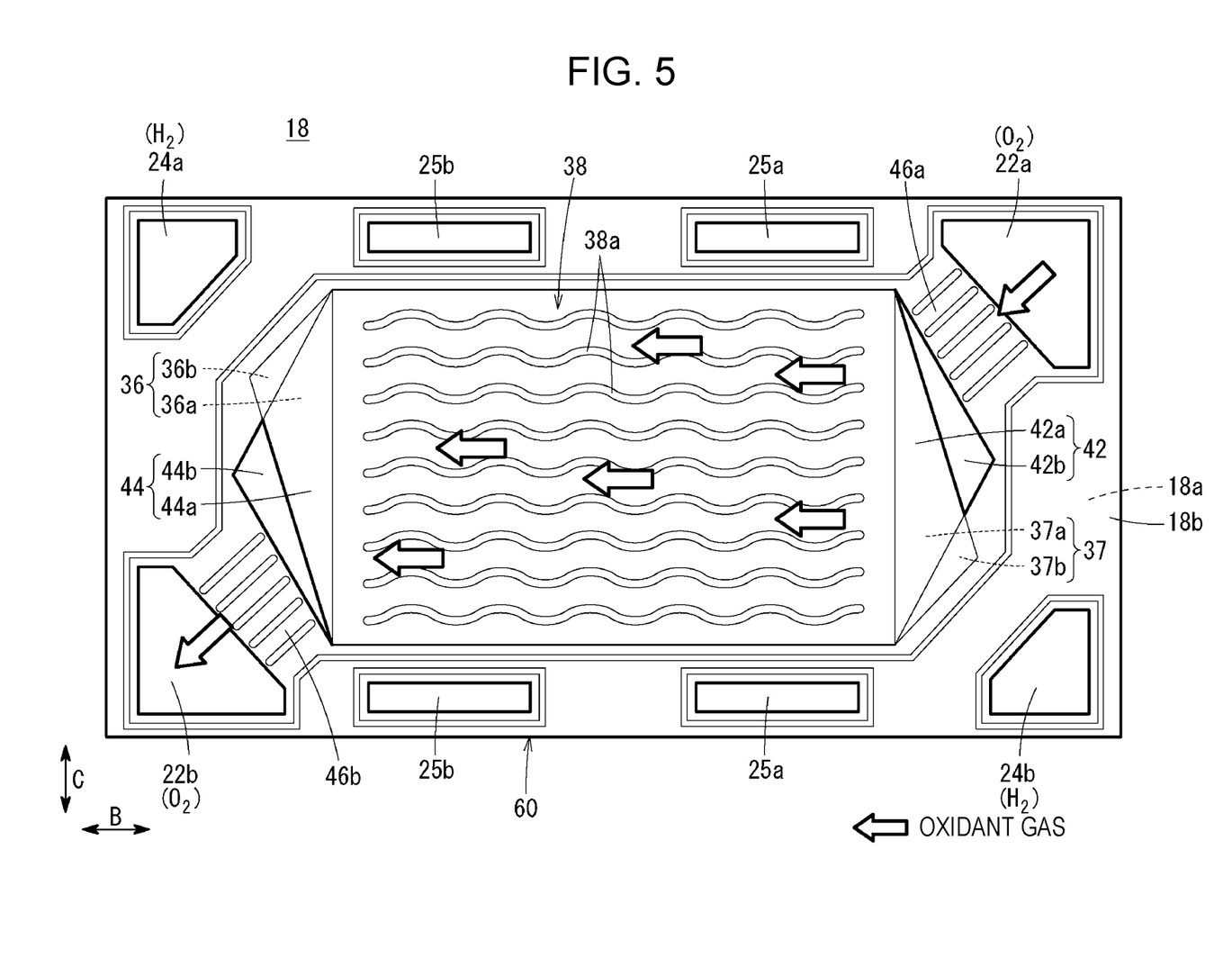
FIG. 5 is a plan view of a second metal separator of the power generation cell.

Referring to FIG. 5, a second oxidant gas channel 38, which is connected to the oxidant gas inlet manifold 22a and the oxidant gas outlet manifold 22b, is formed on the surface 18b of the second metal separator 18 facing the second membrane electrode assembly 16b. The second oxidant gas channel 38 includes a plurality of wave-shaped channel grooves 38a (or linear channel grooves) extending in the direction of arrow B. The shape of the back side of the second oxidant gas channel 38, which is formed in the second metal separator 18, is the shape of the first fuel gas channel 34.

A second oxidant gas inlet buffer portion 42 and a second oxidant gas outlet buffer portion 44 are respectively disposed in the vicinity of the inlet of the second oxidant gas channel 38 and in the vicinity of the outlet of the second oxidant gas channel 38. The second oxidant gas inlet buffer portion 42 has a triangular shape. The second oxidant gas inlet buffer portion 42 includes a first oxidant gas inlet buffer region 42a, which is located close to the second oxidant gas channel 38. The first oxidant gas inlet buffer region 42a is located at a neutral position in the thickness direction of the second metal separator 18.

The second oxidant gas inlet buffer portion 42 includes a second oxidant gas inlet buffer region 42b, which is located close to the oxidant gas inlet manifold 22a and which has a depth in the stacking direction that is larger than that of the first oxidant gas inlet buffer region 42a. The second oxidant gas inlet buffer region 42b is formed on one side of a triangle.

The second oxidant gas outlet buffer portion 44 has a triangular shape. The second oxidant gas outlet buffer portion 44 includes a first oxidant gas outlet buffer region 44a, which is located close to the second oxidant gas channel 38. The first oxidant gas outlet buffer region 44a is located at a neutral position in the thickness direction of the second metal separator 18.

The second oxidant gas outlet buffer portion 44 includes a second oxidant gas outlet buffer region 44b, which is located close to the oxidant gas outlet manifold 22b and which has a depth in the stacking direction that is larger than that of the first oxidant gas outlet buffer region 44a. The second oxidant gas outlet buffer region 44b is formed on one side of a triangle.

A plurality of inlet connection grooves 46a are formed between the second oxidant gas inlet buffer region 42b and the oxidant gas inlet manifold 22a. A plurality of outlet connection grooves 46b are formed between the second oxidant gas outlet buffer region 44b and the oxidant gas outlet manifold 22b.

Referring to FIG. 1, a second fuel gas channel 48, which is connected to the fuel gas inlet manifold 24a and the fuel gas outlet manifold 24b, is formed on a surface 20a of the third metal separator 20 facing the second membrane electrode assembly 16b. The second fuel gas channel 48 includes a plurality of wave-shaped channel grooves 48a (or linear channel grooves) extending in the direction of arrow B.

A second fuel gas inlet buffer portion 50 and a second fuel gas outlet buffer portion 52 are respectively disposed in the vicinity of the inlet of the second fuel gas channel 48 and in the vicinity of the outlet of the second fuel gas channel 48. The second fuel gas inlet buffer portion 50 has a substantially triangular shape. The second fuel gas inlet buffer portion 50 includes a first fuel gas inlet buffer region 50a, which is located close to the second fuel gas channel 48. The first fuel gas inlet buffer region 50a is located at a neutral position in the thickness direction of the third metal separator 20, that is, at a position that is not recessed nor protrudes from either of the surfaces 20a and a surface 20b.

The second fuel gas inlet buffer portion 50 includes a second fuel gas inlet buffer region 50b, which is located close to the fuel gas inlet manifold 24a and which has a depth in the stacking direction that is larger than that of the first fuel gas inlet buffer region 50a.

The second fuel gas outlet buffer portion 52 has a substantially triangular shape. The second fuel gas outlet buffer portion 52 includes a first fuel gas outlet buffer region 52a, which is located close to the second fuel gas channel 48. The first fuel gas outlet buffer region 52a is located at a neutral position in the thickness direction of the third metal separator 20. The second fuel gas outlet buffer portion 52 includes a second fuel gas outlet buffer region 52b, which is located close to the fuel gas outlet manifold 24b and which has a depth in the stacking direction that is larger than that of the first fuel gas outlet buffer region 52a.

A plurality of inlet connection grooves 54a are formed between the second fuel gas inlet buffer region 50b and the fuel gas inlet manifold 24a. The inlet connection grooves 54a are covered by a cover member 56a. A plurality of outlet connection grooves 54b are formed between the second fuel gas outlet buffer region 52b and the fuel gas outlet manifold 24b. The outlet connection grooves 54b are covered by a cover member 56b.

On the surface 20b of the third metal separator 20, a part of the coolant channel 27 is formed on the back side of the second fuel gas channel 48. When the surface 14b of the first metal separator 14 adjacent to the third metal separator 20 is placed on the surface 20b of the third metal separator 20, the coolant channel 27 is integrally formed on the surface 20b.

The back side of the first oxidant gas inlet buffer portion 28 and the back side of the first oxidant gas outlet buffer portion 30 of the first metal separator 14 are respectively in contact with the back side of the second fuel gas outlet buffer portion 52 and the back side of the second fuel gas inlet buffer portion 50 of the third metal separator 20.

To be specific, referring to FIGS. 2 and 4, the first embossed portions 28e1 and the second embossed portions 28e2 of the first oxidant gas inlet buffer portion 28 are in contact with the flat surface on the back side of the second fuel gas outlet buffer portion 52. The first embossed portions 30e1 and the second embossed portions 30e2 of the first oxidant gas outlet buffer portion 30 are in contact with the flat surface on the back side of the second fuel gas inlet buffer portion 50 (see FIG. 1).

Referring to FIG. 1, a first sealing member 58 is integrally formed on the surfaces 14a and 14b of the first metal separator 14 so as to surround the outer peripheral end portion of the first metal separator 14. A second sealing member 60 is integrally formed on the surfaces 18a and 18b of the second metal separator 18 so as to surround the outer peripheral end portion of the second metal separator 18. A third sealing member 62 is integrally formed on the surfaces 20a and 20b of the third metal separator 20 so as to surround the outer peripheral end portion of the third metal separator 20.

The first sealing member 58, the second sealing member 60, and the third sealing member 62 are each made of an elastic rubber material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIG. 2, the first membrane electrode assembly 16a and the second membrane electrode assembly 16b each include a solid polymer electrolyte membrane 64, which is, for example, a thin film that is made of a perfluorosulfonic acid polymer including water. The solid polymer electrolyte membrane 64 is sandwiched between a cathode electrode 66 and an anode electrode 68.

Each of the first membrane electrode assembly 16a and the second membrane electrode assembly 16b is a stepped MEA in which the planar dimensions of the cathode electrode 66 are smaller than those of the anode electrode 68 and the solid polymer electrolyte membrane 64. Alternatively, the cathode electrode 66 may have planar dimensions the same as those of the anode electrode 68 and the solid polymer electrolyte membrane 64. The anode electrode 68 may have planar dimensions smaller than those of the cathode electrode 66 and the solid polymer electrolyte membrane 64.

The cathode electrode 66 and the anode electrode 68 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed, for example, on both sides of the solid polymer electrolyte membrane 64.

In the first membrane electrode assembly 16a, a first resin frame member 70 is disposed on an outer peripheral portion of the solid polymer electrolyte membrane 64 so as to be located outward from an edge of the cathode electrode 66. The first resin frame member 70 is integrally formed, for example, by injection molding. In the second membrane electrode assembly 16b, a second resin frame member 72 is disposed on an outer peripheral portion of the solid polymer electrolyte membrane 64 so as to be located outward from an edge of the cathode electrode 66. The second resin frame member 72 is integrally formed, for example, by injection molding.

An electrically insulating commodity plastic, an engineering plastic, a super engineering plastic, or the like may be used as the material of the first resin frame member 70 and the second resin frame member 72. Each of the resin frame members 70 and 72 may be made from, for example, a film or the like. The first resin frame member 70 and the second resin frame member 72 have outer shapes having dimensions such that the resin frame members 70 and 72 are disposed further inward than the manifolds, including the oxidant gas inlet manifold 22a.

Referring to FIG. 1, on a surface of the first resin frame member 70 on the cathode electrode 66 side, an inlet buffer portion 74a is disposed between the oxidant gas inlet manifold 22a and the inlet of the first oxidant gas channel 26. On the surface of the first resin frame member 70 on the cathode electrode 66 side, an outlet buffer portion 74b is disposed between the oxidant gas outlet manifold 22b and the outlet of the first oxidant gas channel 26.

The inlet buffer portion 74a includes a plurality of embossed portions 76a (or a flat surface), which are located close to the oxidant gas inlet manifold 22a, and a plurality of linear inlet guide channels 78a (or embossed portions), which are located close to the first oxidant gas channel 26. The outlet buffer portion 74b includes a plurality of embossed portions 76b (or a flat surface), which are located close to the oxidant gas outlet manifold 22b, and a plurality of linear outlet guide channels 78b (or embossed portions), which are located close to the first oxidant gas channel 26.

Figure 6:
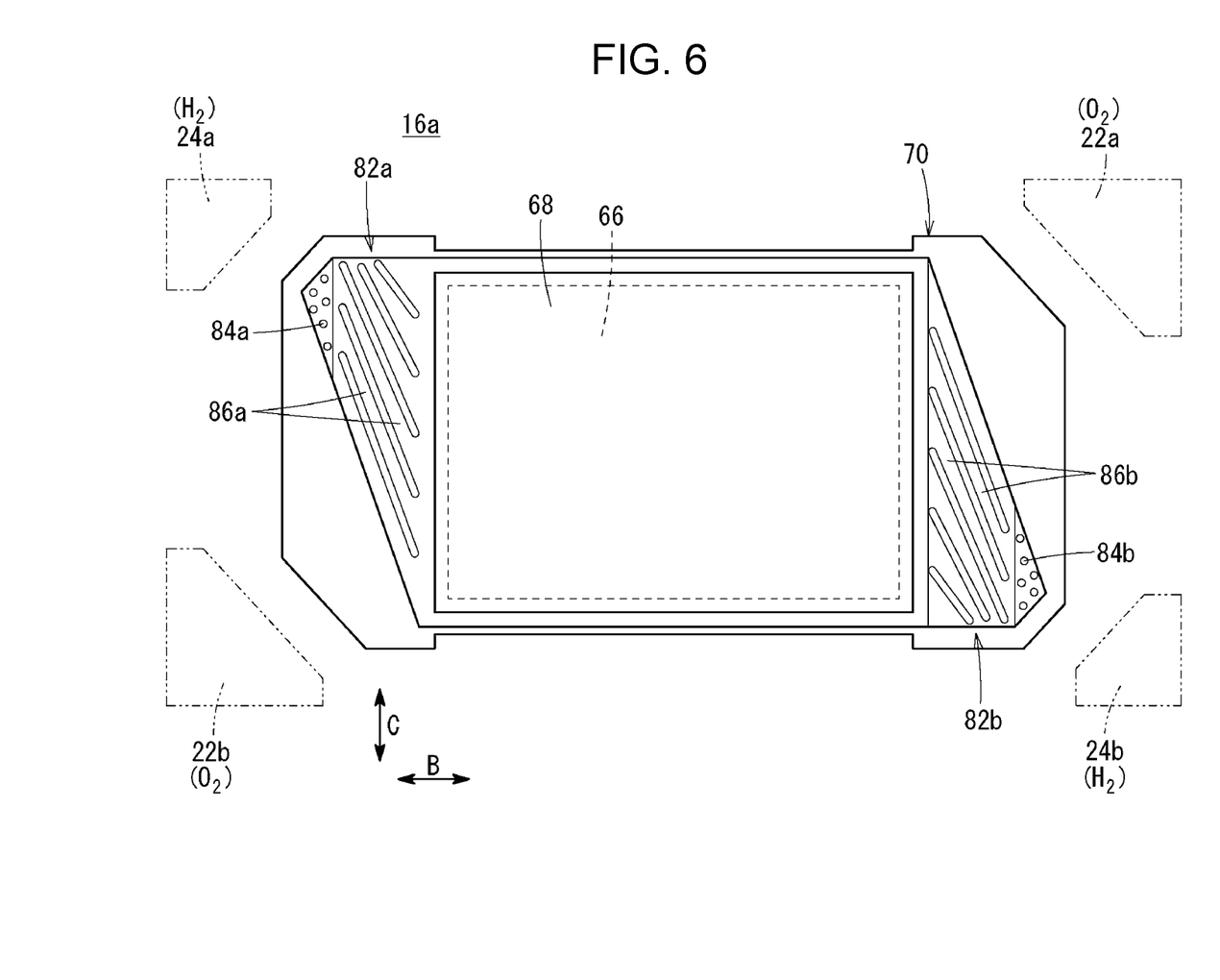
FIG. 6 is a plan view of a first membrane electrode assembly of the power generation cell.

Referring to FIG. 6, on a surface of the first resin frame member 70 on the anode electrode 68 side, an inlet buffer portion 82a is disposed between the fuel gas inlet manifold 24a and the first fuel gas channel 34. On the surface of the first resin frame member 70 on the anode electrode 68 side, an outlet buffer portion 82b is disposed between the fuel gas outlet manifold 24b and the first fuel gas channel 34.

The inlet buffer portion 82a includes a plurality of embossed portions 84a (or a flat surface), which are located close to the fuel gas inlet manifold 24a, and a plurality of linear inlet guide channels 86a (or embossed portions), which are located close to the first fuel gas channel 34. The outlet buffer portion 82b includes a plurality of embossed portions 84b (or a flat surface), which are located close to the fuel gas outlet manifold 24b, and a plurality of linear outlet guide channels 86b (or embossed portions), which are located close to the first fuel gas channel 34.

Referring to FIG. 1, on a surface of the second resin frame member 72 on the cathode electrode 66 side, an inlet buffer portion 90a is disposed between the oxidant gas inlet manifold 22a and the inlet of the second oxidant gas channel 38. On the surface of the second resin frame member 72 on the cathode electrode 66 side, an outlet buffer portion 90b is disposed between the oxidant gas outlet manifold 22b and the outlet of the second oxidant gas channel 38.

The inlet buffer portion 90a includes a plurality of embossed portions 92a (or a flat surface), which are located close to the oxidant gas inlet manifold 22a, and a plurality of linear inlet guide channels 94a (or embossed portions), which are located close to the second oxidant gas channel 38. The outlet buffer portion 90b includes a plurality of embossed portions 92b (or a flat surface), which are located close to the oxidant gas outlet manifold 22b, and a plurality of linear outlet guide channels 94b (or embossed portions), which are located close to the second oxidant gas channel 38.

Figure 7:
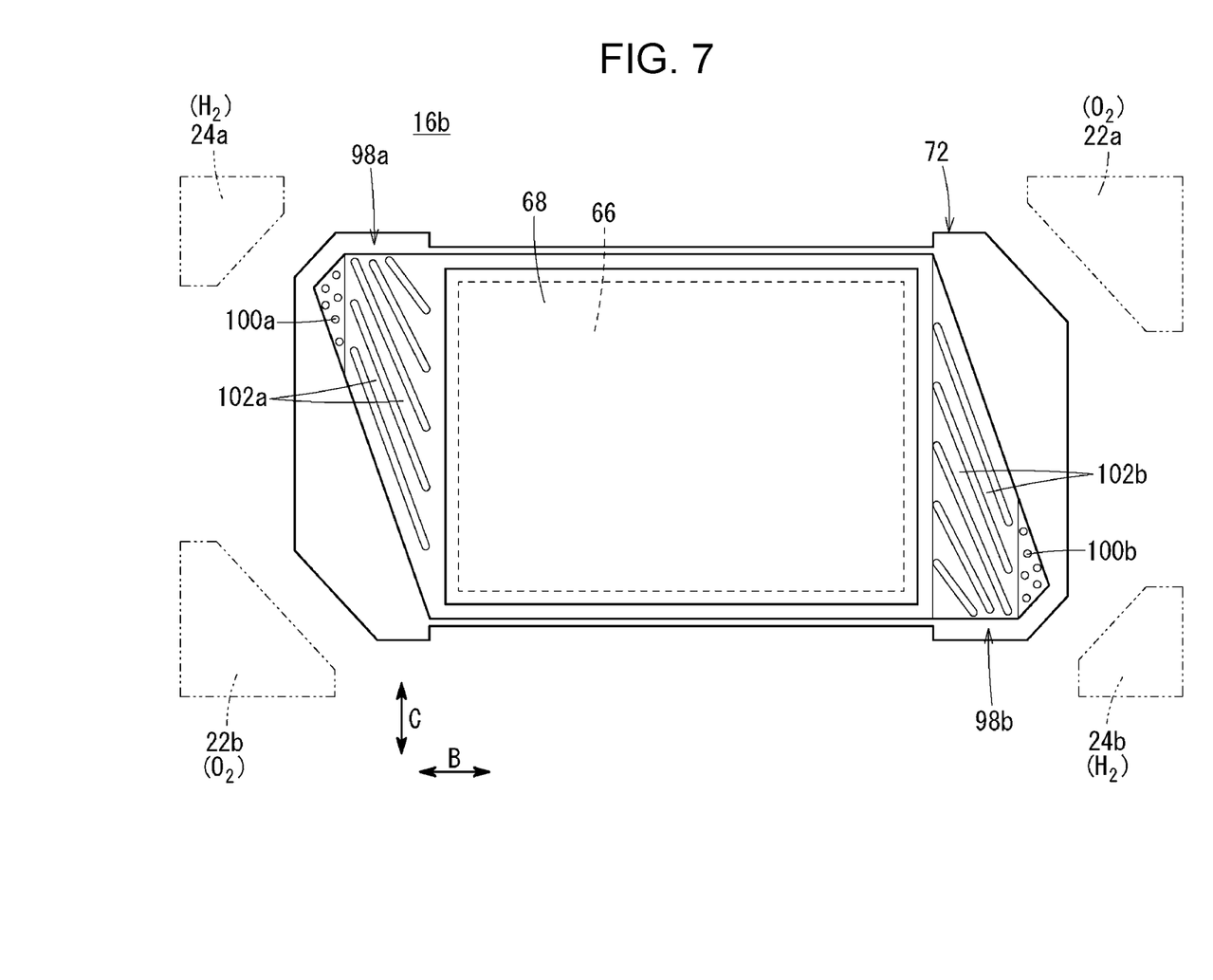
FIG. 7 is a plan view of a second membrane electrode assembly of the power generation cell.

Referring to FIG. 7, on a surface of the second resin frame member 72 on the anode electrode 68 side, an inlet buffer portion 98a is disposed between the fuel gas inlet manifold 24a and the second fuel gas channel 48. On the surface of the second resin frame member 72 on the anode electrode 68 side, an outlet buffer portion 98b is disposed between the fuel gas outlet manifold 24b and the second fuel gas channel 48.

The inlet buffer portion 98a includes a plurality of embossed portions 100a (or a flat surface), which are located close to the fuel gas inlet manifold 24a, and a plurality of linear inlet guide channels 102a (or embossed portions), which are located close to the second fuel gas channel 48. The outlet buffer portion 98b includes a plurality of embossed portions 100b (or a flat surface), which are located close to the fuel gas outlet manifold 24b, and a plurality of linear outlet guide channels 102b (or embossed portions), which are located close to the second fuel gas channel 48.

When two power generation cells 12 are stacked on top of each other, the coolant channel 27 is formed between the first metal separator 14 of one of the power generation cells 12 and the third metal separator 20 of the other power generation cell 12 (see FIGS. 1 and 2).

An operation of the fuel cell 10, which is structured as described above, will be described.

Referring to FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or oil, is supplied to the pair of coolant inlet manifolds 25a.

A part of the oxidant gas flows through the oxidant gas inlet manifold 22a, the inlet buffer portion 74a, and the first oxidant gas inlet buffer portion 28; and is supplied to the first oxidant gas channel 26 of the first metal separator 14 (see FIGS. 1 to 3). The remaining part of the oxidant gas flows through the oxidant gas inlet manifold 22a, the inlet buffer portion 90a, and the second oxidant gas inlet buffer portion 42; and flows into the second oxidant gas channel 38 of the second metal separator 18 (see FIGS. 1 and 5).

Referring to FIGS. 1, 3, and 5, the oxidant gas is supplied to the cathode electrode 66 of the first membrane electrode assembly 16a while flowing along the first oxidant gas channel 26 in the direction of arrow B (horizontal direction). Likewise, the oxidant gas is supplied to the cathode electrode 66 of the second membrane electrode assembly 16b while flowing along the second oxidant gas channel 38 in the direction of arrow B.

Referring to FIGS. 1 and 6, the fuel gas flows through the fuel gas inlet manifold 24a and the inlet connection grooves 35a of the second metal separator 18 and is supplied to the inlet buffer portion 82a and the first fuel gas inlet buffer portion 36. Likewise, referring to FIGS. 1 and 7, the fuel gas flows through the inlet connection grooves 54a of the third metal separator 20 and is supplied to the inlet buffer portion 98a and the second fuel gas inlet buffer portion 50. Therefore, the fuel gas is supplied to the first fuel gas channel 34 of the second metal separator 18 and the second fuel gas channel 48 of the third metal separator 20.

The fuel gas is supplied to the anode electrode 68 of the first membrane electrode assembly 16a while flowing along the first fuel gas channel 34 in the direction of arrow B. Likewise, the fuel gas is supplied to the anode electrode 68 of the second membrane electrode assembly 16b while flowing along the second fuel gas channel 48 in the direction of arrow B.

Accordingly, in the first membrane electrode assembly 16a and the second membrane electrode assembly 16b, the oxidant gas supplied to the cathode electrodes 66 and the fuel gas supplied to the anode electrodes 68 cause electrochemical reactions in the electrode catalyst layers, and thereby electric power is generated.

The oxidant gas, which has been supplied to the cathode electrodes 66 of the first membrane electrode assembly 16a and the second membrane electrode assembly 16b and partially consumed, is discharged to the outlet buffer portions 74b and 90b. The oxidant gas is discharged from the first oxidant gas outlet buffer portion 30 and the second oxidant gas outlet buffer portion 44 to the oxidant gas outlet manifold 22b.

The fuel gas, which has been supplied to the anode electrodes 68 of the first membrane electrode assembly 16a and the second membrane electrode assembly 16b and partially consumed, is discharged to the outlet buffer portions 82b and 98b. The fuel gas is discharged from the first fuel gas outlet buffer portion 37 and the second fuel gas outlet buffer portion 52 to the fuel gas outlet manifold 24b through the outlet connection grooves 35b and 54b.

Referring to FIG. 1, the coolant, which has been supplied to the pair of upper and lower coolant inlet manifolds 25a, is introduced into the coolant channel 27. The coolant is suppled from the coolant inlet manifolds 25a to the coolant channel 27, temporarily flows inward in the direction of arrow C, then flows in the direction of arrow B, and cools the first membrane electrode assembly 16a and the second membrane electrode assembly 16b. Then, the coolant flows outward in the direction of arrow C and is discharged to the pair of coolant outlet manifolds 25b.

Referring to FIG. 3, in the first embodiment, the first oxidant gas inlet buffer portion 28 includes the first oxidant gas inlet buffer region 28a and the second oxidant gas inlet buffer region 28b, which has a depth in the stacking direction that is larger than that of the first oxidant gas inlet buffer region 28a. The plurality of first embossed portions 28e1 are formed in the first oxidant gas inlet buffer region 28a. The plurality of second embossed portion 28e2 are formed in the second oxidant gas inlet buffer region 28b.

Referring to FIG. 4, the dimensions (at least the diameter or the radius of the corner portion) of each of the second embossed portions 28e2 in the deep buffer portion are smaller than those of each of the first embossed portions 28e1 in the shallow buffer portion. Therefore, a load in the stacking direction can be evenly shared between the first oxidant gas inlet buffer region 28a and the second oxidant gas inlet buffer region 28b, which have different depths. Accordingly, an advantage is obtained in that a stress, which tends to be generated in the first oxidant gas inlet buffer portion 28, can be effectively reduced.

The first oxidant gas outlet buffer portion 30 provides the same advantage as the first oxidant gas inlet buffer portion 28. In the first embodiment, the first metal separator 14 is described as an example. However, this is not a limitation. For example, the second metal separator 18 or the third metal separator 20 may have the same structure as the first metal separator 14. Instead of the first metal separator 14, the first resin frame member 70 may include the first oxidant gas inlet buffer portion 28 and the first oxidant gas outlet buffer portion 30. The second resin frame member 72 may have the buffer portions.

Figure 8:
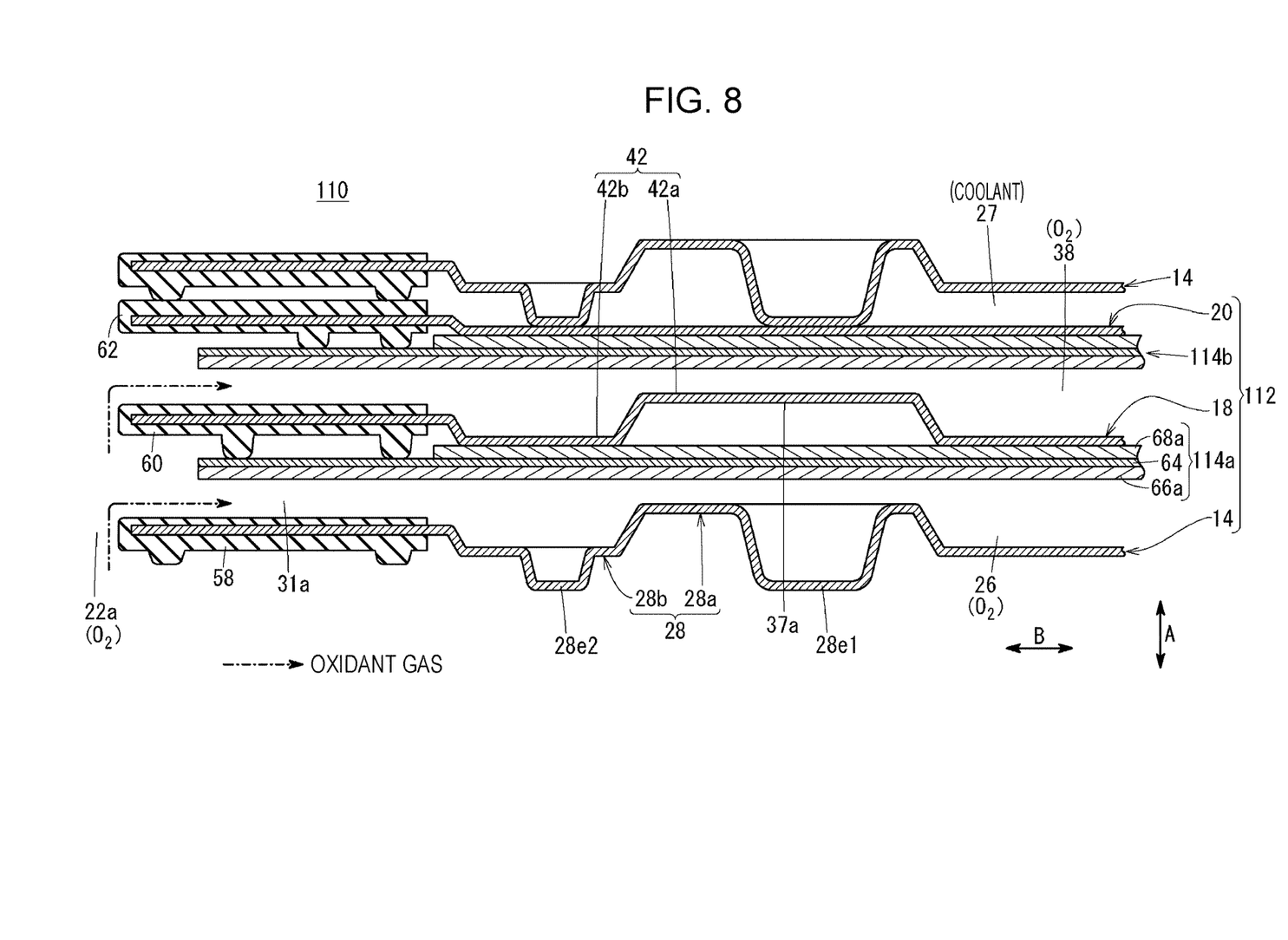
FIG. 8 is a partial sectional view of a fuel cell according to a second embodiment of the present disclosure.

FIG. 8 is a partial sectional view of a fuel cell 110 according to a second embodiment of the present disclosure. Elements of the fuel cell 110 that are the same as those of the fuel cell 10 according to the first embodiment will be denoted by the same numerals and detailed descriptions of such elements will be omitted.

The fuel cell 110 includes a plurality of power generation cells 112 that are stacked. Each of the power generation cells 112 includes the first metal separator 14, a first membrane electrode assembly 114a, the second metal separator 18, a second membrane electrode assembly 114b, and the third metal separator 20.

The first membrane electrode assembly 114a and the second membrane electrode assembly 114b do not have resin frame members. The solid polymer electrolyte membrane 64 is sandwiched between a cathode electrode 66a and an anode electrode 68a. Each of the first and second membrane electrode assemblies 114a and 114b is a stepped MEA in which the cathode electrode 66a has planar dimensions smaller than those of the anode electrode 68a and the solid polymer electrolyte membrane 64. However, the membrane electrode assemblies 114a and 114b may be structured in the same way as the first embodiment.

In the second embodiment, the dimensions of each of the second embossed portions 28e2 in the deep buffer portion are smaller than those of each of the first embossed portions 28e1 in the shallow buffer portion. Therefore, a load in the stacking direction can be evenly shared between the first oxidant gas inlet buffer region 28a and the second oxidant gas inlet buffer region 28b, which have different depths. Accordingly, as with the first embodiment, an advantage is obtained in that a stress, which tends to be generated in the first oxidant gas inlet buffer portion 28, can be effectively reduced.

According to an aspect of the present disclosure, a fuel cell includes a membrane electrode assembly in which electrodes are disposed on both sides of an electrolyte membrane; and separators stacked on the membrane electrode assembly. One of the separators facing one of the electrodes includes a reactant gas channel through which a reactant gas flows along an electrode surface. The one of the separators further includes a reactant gas manifold through which the reactant gas flows in a stacking direction in which the membrane electrode assembly and the separators are stacked, and a reactant gas buffer portion that connects the reactant gas channel and the reactant gas manifold to each other.

According to another aspect of the present disclosure, a fuel cell includes a membrane electrode assembly in which electrodes are disposed on both sides of an electrolyte membrane and a resin frame member is integrally formed on an outer periphery of the electrolyte membrane; and separators stacked on the membrane electrode assembly. One of the separators facing one of the electrodes includes a reactant gas channel through which a reactant gas flows along an electrode surface. The one of the separators further includes a reactant gas manifold through which the reactant gas flows in a stacking direction in which the membrane electrode assembly and the separators are stacked. The resin frame member includes a reactant gas buffer portion that connects the reactant gas channel and the reactant gas manifold to each other.

The reactant gas buffer portion includes a first buffer region, and a second buffer region having a depth in the stacking direction that is larger than that of the first buffer region. A plurality of first embossed portions are formed in the first buffer region. A plurality of second embossed portions are formed in the second buffer region. A diameter of each the second embossed portions is smaller than that of each of the first embossed portions, or a radius of a corner at an end of each of the second embossed portions is smaller than that of each of the first embossed portions.

In the fuel cell, preferably, the one of the separators may include a coolant channel formed on a surface thereof opposite to a surface thereof facing the one of the electrodes, the coolant channel allowing a coolant to flow in a direction along the electrode surface through a space between the one of the separators and an adjacent separator. In this case, preferably, the first embossed portions and the second embossed portions are formed so as to protrude toward the coolant channel.

With the present disclosure, the dimensions of each of the second embossed portions in the second buffer region, which is a deep buffer portion, are smaller than those of each of the first embossed portions in the first buffer region, which is a shallow buffer portion. Therefore, a load in the stacking direction can be evenly shared between the first buffer region and the second buffer region, which have different depths. Accordingly, a stress, which tends to be generated in the reactant gas buffer portion, can be effectively reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly in which electrodes are disposed on both sides of an electrolyte membrane;
a frame member disposed on an outer peripheral portion of the membrane electrode assembly; and
separators stacked on the membrane electrode assembly, wherein one of the separators facing one of the electrodes includes
a reactant gas channel through which a reactant gas flows along an electrode surface,
a reactant gas manifold through which the reactant gas flows in a stacking direction in which the membrane electrode assembly and the separators are stacked, and
a reactant gas buffer portion that connects the reactant gas channel and the reactant gas manifold to each other,
wherein the reactant gas buffer portion includes
a first buffer region having a first depth between the frame member and the one of the separators, and
a second buffer region having a second depth in the stacking direction between the frame member and the one of the separators, the second depth being larger than the first depth, the second buffer region being closer to the reactant gas manifold than the first buffer region,
wherein a plurality of first embossed portions are formed in the first buffer region, the plurality of first embossed portions protruding from the first depth in the stacking direction away from the frame member,
wherein a plurality of second embossed portions are formed in the second buffer region, the plurality of second embossed portions protruding from the second depth in the stacking direction away from the frame member, and
wherein a diameter of each the second embossed portions is smaller than a diameter of each of the first embossed portions, or a radius of curvature of a rounded corner at an end of each of the second embossed portions is smaller than a radius of curvature of a rounded corner of each of the first embossed portions.

2. The fuel cell according to claim 1,
wherein the one of the separators includes a coolant channel formed on a surface thereof opposite to a surface thereof facing the one of the electrodes, the coolant channel allowing a coolant to flow in a direction along the electrode surface through a space between the one of the separators and an adjacent separator, and
wherein the first embossed portions and the second embossed portions are formed so as to protrude toward the coolant channel.

3. A fuel cell comprising:
a membrane electrode assembly comprising:
an electrolyte membrane; and
first and second electrodes sandwiching the electrolyte membrane therebetween in a stacking direction;
a frame member disposed on an outer peripheral portion of the membrane electrode assembly; and
first and second separators stacked on the first and second electrodes, respectively, in the stacking direction to form a reactant gas channel between the first electrode and the first separator, the first separator comprising:
a reactant gas manifold through which the reactant gas is to flow in the stacking direction; and
a reactant gas buffer portion connecting the reactant gas channel and the reactant gas manifold, the reactant gas buffer portion comprising:
a first buffer region having a first depth in the stacking direction between the frame member and the first separator, first embossed portions being formed in the first buffer region, the first embossed portions protruding from the first depth in the stacking direction away from the frame member, each of the first embossed portions having a first diameter and a first radius of curvature of a rounded corner at a distal end of each of the first embossed portions; and
a second buffer region having a second depth in the stacking direction between the frame member and the first separator, the second depth being larger than the first depth, the second buffer region being closer to the reactant gas manifold than the first buffer region, second embossed portions being formed in the second buffer region, the second embossed portions protruding from the second depth in the stacking direction away from the frame member, each of the second embossed portions having a second diameter and a second radius of curvature of a rounded corner at a distal end of each of the second embossed portions, the second diameter being smaller than the first diameter or the second radius being smaller than the second diameter.

4. The fuel cell according to claim 3, further comprising:
a third separator facing the first separator opposite to the electrode in the stacking direction, the first separator and the third separator constituting a coolant channel through which a coolant is to flow in a direction along the electrode between the first separator and the third separator, wherein the first embossed portions and the second embossed portions are formed so as to protrude toward the coolant channel.

5. The fuel cell according to claim 1,
wherein the plurality of first embossed portions and the plurality of second embossed portions each protrude so as to contact a flat surface of another of the separators.

6. The fuel cell according to claim 1,
wherein the plurality of first embossed portions and the plurality of second embossed portions each have cylindrical shapes.

7. The fuel cell according to claim 1,
wherein the diameter of each the second embossed portions is smaller than the diameter of each of the first embossed portions.

8. The fuel cell according to claim 1,
wherein the radius of curvature of the rounded corner at the end of each of the second embossed portions is smaller than the radius of curvature of the rounded corner of each of the first embossed portions.

9. The fuel cell according to claim 4,
wherein the first embossed portions and the second embossed portions each protrude so as to contact a flat surface of the third separator.

10. The fuel cell according to claim 3,
wherein the first embossed portions and the second embossed portions each have cylindrical shapes.

11. The fuel cell according to claim 3,
wherein the second diameter is smaller than the first diameter.

12. The fuel cell according to claim 3,
wherein the second radius is smaller than the second diameter.

* * * * *